United States Patent [19]

Takahiro

[11] Patent Number: 5,982,394
[45] Date of Patent: Nov. 9, 1999

[54] PICTURE IMAGE COMPOSITION SYSTEM

[75] Inventor: Kimoto Takahiro, Tokyo, Japan

[73] Assignee: NEC Corporation, Tokyo, Japan

[21] Appl. No.: 08/999,393

[22] Filed: Dec. 29, 1997

[30] Foreign Application Priority Data

Dec. 27, 1996 [JP] Japan .................................. 8-350193

[51] Int. Cl.[6] .................................................. G06F 13/00
[52] U.S. Cl. ........................... 345/508; 345/433; 345/523
[58] Field of Search .................................. 345/508, 501, 345/523, 426, 427, 433

[56] References Cited

U.S. PATENT DOCUMENTS

| | | | |
|---|---|---|---|
| 4,739,401 | 4/1988 | Sacks et al. ............................. | 382/103 |
| 5,142,616 | 8/1992 | Kellas et al. ............................. | 345/428 |
| 5,537,528 | 7/1996 | Takahashi et al. ....................... | 345/302 |

*Primary Examiner*—Kee M. Tung
*Attorney, Agent, or Firm*—Foley & Lardner

[57] ABSTRACT

When identification data 601 and required scene data 602 of a target object are inputted by specifying by a user, a memory 2 rewrites scene data of a stored target object image to required scene data. After that, a identification data extractor 52 extracts object image data and scene data of elemental and composite object images included in the object image specified from the memories 1 and 2. An object composer 41 composes the object image based on the object image data and scene data.

12 Claims, 8 Drawing Sheets

PICTURE IMAGE COMPOSITION SYSTEM

BACKGROUND OF THE INVENTION

The present invention relates to a picture image composition system for generating a composite image by overlapping a plurality of groups of object images, and more particularly to a picture image composition system capable of changing a transformation or position of an arbitrary object image in a composite image.

An object image 1000 as each of object images constituting an output image 100 is supplied to an image composition system, and is stored in a memory 1 together with identification information 301. A memory 2 receives and stores scene information 2000 together with the corresponding identification information 301, the scene information 2000 which includes position data of each of object images in the output image 100 and a various kinds of transformation data such as geometrical data, light source data, color transformation data and the like, which define the various kinds of transformation operation when each object image is displayed in the output image. Here, the object image 100 and scene information 2000 are supplied to the image composition system regardless of a displayed order in the output image 100. A memory 3 stores depth information 3000 which shows a displayed order of each of the object images in the output image 100.

A depth data retriever 60 retrieves the object image and scene information from individual depth data 3001 in the depth information 3000 stored in the memory 3 to output identification data 3002 directed by the depth data 3001 to the memories 1 and 2, respectively. A scene data separator 44 separates scene data 231 supplied from the memory 2 into transformation data 241 and position data 242. After object image data 130 issued from the memory 1 are processed in an image processing unit 43 with transformation processing according to the transformation data 241, the object image data 130 are written in a frame memory 40 according to the position data 242. When all of the object image data stored in the memory 1 are written in the frame memory 40, the output image 100 is generated on the frame memory 40.

There is described operation at transforming the specified object which has been selected by a user. When the memory 2 receives target object identification information 601 for discriminating an object image selected by the user and required scene information 602 denoting a various kinds of transformation such as a position change and image processing required by the user, the image composition system rewrites a specified scene data which are included in the scene data stored in the memory 2 and are specified by the target object identification information 601, to the required scene information 602. After that, the image processing unit 43 writes all of the object image data 130 stored in the memory 1 into the frame memory 40 according to the method as the same as that described above. By this, it is possible to generate the output image which is processed by the required transformation by the user with respect to the target object specified by the target object identification information 601.

However, since the conventional image composition system writes all of the object image data constituting the output image into the frame memory after the target object image has been transformed when the user requires the transformation of the object image in the output image as described above, it is necessary to write all of the object image data into the frame memory after the same transformation is performed to individual object image constituting the target composite object image when the target object image is the composite object image in which the plurality of object images are superposed on each other. Accordingly, when the user requires to compose another image by using a n object image as a part of the output image, there is the problem that the number of processing image must be processed because all of the object images constituting the output image are necessary to be processed.

SUMMARY OF THE INVENTION

The objective of the present invention is to solve the above tasks.

The objective of the present invention is achieved by a picture image composition system according to a first aspect, which is characterized in comprising: a first memory for storing information of each of elemental object images constituting an output image together with a first identification data group as a set of identification data for discriminating each of the object images; a second memory for storing scene information representing display information when each of the elemental object images is displayed as the output image, together with the first identification data group; a third memory for storing object structure information representing a hierarchical interposition of the elemental object images, composite image composed by the elemental object images and the output image as a tree structure in which the output image corresponds to a root, the composite object image to a node and the individual elemental object image to a leaf; a scene data composer for calculating, based on the tree structure represented by the object structure information, composite scene data as scene data of the composite object image corresponding to the node of the tree structure from scene data of the elemental object images and the composite object image included in the composite object image corresponding to the node of the tree structure, and for generating second identification data for discriminating the composite object image corresponding to the node of the tree structure, so as to output the scene data to be stored in the second memory together with the second identification data; a identification data extractor, based on the object structure information stored in the second memory, for generating third identification data to output and store in the first and second memories as identification data for discriminating the composite object image included in a target object image which is the composite object image or the output image respectively corresponding to arbitrary node or root, for generating a third identification data group to output and store in the first and second memories as identification data for discriminating the elemental object image included in the target object image, for generating fourth identification data to output and store in the second memory as identification data for discriminating the target object image, and for generating decision data for deciding as to whether the target object image corresponds to the node or the root in the tree structure so as to output the decision data to an object image transmitter; a scene data transformer for transforming composite scene data and scene data into a transform scene data group as a relative value to output it to an object composer, in which the composite scene data are that of the composite object image included in the target object image and are outputted from the second memory based on the third identification data, the scene data are that of the elemental object image included in the target object image and are outputted from the second memory based on the third identification data group, and the transform scene data group corresponds to the composite scene data of the target object image outputted from the second memory based on the fourth identification data; the object composer for generating composite image data including a composite image of the target object image to output it to the object image transmitter, based on the composite object image data, the elemental object image data and the transformation scene data group, in which the composite object image data include the composite object image included in the target object image and are outputted from the first memory based on the third identification data, in which the elemental object image data include the elemental object image included in the target object image and are outputted from the first memory based on the third identification data, and in which the transformation scene data group is outputted from the scene data transformer; the object image transmitter for outputting the composite image data to an image display unit in a first case where the decision data determine the target object image to be the output image corresponding to the root, and for outputting the composite image data as new object image to the first memory to be stored together with the identification data of the target object image in a second case where the identification data determine the target object image corresponding to the node.

There is a picture image composition system of a second aspect according to the system of the first aspect: wherein the first and second memories and the identification data extractor respectively input as target object identification data the identification data which are to identify as the target the elemental or composite object image which is selected by a user from the elemental or composite image constituting the output image; wherein, when the second memory receives required scene data which are required by the user to the target object image, the second memory rewrites the scene information of the target object image to the required scene data; wherein the identification data extractor generates fifth and sixth identification data, a fifth identification data group to input in the first and second memories and decision data to input the object image transmitter, in which the fifth identification data are to identify the composite object image included in the composite object image comprising of the target object image, the sixth identification data are to identify the composite object image consisting of the target object image, the fifth identification data group is to identify the elemental object image included in the composite object image comprising the target object image, and the decision data are to decide as to whether the composite object image comprising the target object image corresponds to the node or the root; wherein the scene data transformer transforms first and second required scene data into a transformation scene data group to output to the object composer, in which the first required scene data are the required scene data of the target object image or the scene data of the composite object image outputted from the second memory based on the fifth identification data, the second required scene data are the required scene data of the target object image or the scene data of the elemental object image outputted from the second memory based on the fifth identification data group, and the transformation scene data group has a relative value corresponding to composite scene data outputted from the second memory based on the sixth identification data for discriminating the composite object image comprising the target object image; wherein the object composer for generating object image of the composite object image to output it as composite image data to the object image transmitter based on first and second image data of the composite object or target object and the transformation scene data group, in which the composite image includes the composite object image comprising the target object image, the first image data are outputted from the first memory based on the fifth identification data, the second image data are outputted from the first memory based on the fifth identification data group, and the transformation scene group is outputted from the scene data transformer; and wherein the object image transmitter, based on the decision data, outputs the composite image data to the image display unit when the composite object image comprising the target object image corresponds to the root, and outputs composite image data as a new object image to the first memory to store them together with identification data of the composite object image of a upper rank when the composite object image comprising the target object image corresponds to the node.

A picture image composition system of a third aspect according to the system of the first aspect, further comprises a partial tree generator to which the object structure data are inputted: wherein the first and second memories and the partial tree generator respectively input as target object identification data the identification data which are to identify as the target object image the elemental or composite object image which is selected by a user from the elemental or composite image constituting the output image; wherein, when the second memory receives required scene data which are required by the user to the target object image, the second memory rewrites the scene information of the target object image to the required scene data; wherein the partial tree generator generates partial object structure data representing a partial tree structure to store them in the third memory, in which the partial tree structure has a constitution in which a first tree structure consisting of the elemental object image one rank under the output image has no change, a second tree structure of the composite object image one rank under the output image and not constituting of the target object image changes to a first single composite object image having the composite object image and the composite scene data, and a third structure of the composite object image included in the composite object image comprising the target object image changes to a second single composite object image having the composite object image data and the composite scene data or required scene data; wherein the third memory rewrites the stored object structure data to the partial object structure data; wherein the identification data extractor generates eighth identification data of the composite object image comprising the target object image based on the partial object structure data so as to output the eighth identification data to the first and second memories, generates seventh identification data for discriminating the composite object image included in the composite object image comprising the target object image so as to output the seventh identification data to the first and second memories, generates a seventh identification data group as identification data for discriminating the composite object image comprising the target object image so as to output the seventh identification data group to the first and second memories, and generates decision data for deciding as to whether the composite object image comprising the target object image corresponds to the node or root in the object structure data so as to output the decision data to the object image transmitter; wherein the scene data transformer the first and second required scene data into a transformation scene data group to output to the object composer, in which the first required scene data are the required scene data of the target object image or the scene data of the composite object image outputted from the second memory based on the seventh identification data, the second required scene data are the required scene data of the target object image or the scene data of the elemental object image outputted from the second memory based on the seventh identification data group, and the transformation scene data group has a relative value corresponding to composite scene data outputted from the second memory based on the eighth identification data for discriminating the composite object image comprising the target object image; wherein the object composer generates a composite image of the composite object image to output it as composite image data to the object image transmitter based on first and second image data of the composite object or target object and the transformation scene data group, in which the composite image includes the composite object image comprising the target object image, the first image data are outputted from the first memory based on the seventh identification data, the second image data are outputted from the first memory based on the seventh identification data group, and the transformation scene group is outputted from the scene data transformer; and wherein the object image transmitter, based on the decision data, outputs the composite image data to the image display unit when the composite object image comprising the target object image corresponds to the root, and outputs composite image data as a new object image to the first memory to store them together with identification data of the composite object image of a upper rank when the composite object image comprising the target object image corresponds to the node.

There is a picture image composition system according to a fourth aspect, in the system according to the first aspect, having the scene data composer comprising: a fourth memory for storing the object structure data; a tree retriever for outputting the identification data of the elemental and composite object images included in the composite object image corresponding to an arbitrary node in the tree structure representing the object structure data, based on the object structure data, to the second memory, and for outputting the identification data as second identification data of the composite object image corresponding to the arbitrary node, to the second memory; and a scene data generator for calculating as composite scene data the scene data of the composite object image corresponding to the arbitrary node based on the scene data of the elemental and composite object images included in the composite object image corresponding to the arbitrary node which are outputted from the second memory.

In the system according to the fourth aspect, there is a picture image composition system according to a fifth aspect, in which the operation for calculating as the composite scene data the scene data of the composite object image corresponding to the arbitrary node, is a calculation of, as the composite scene data, a mean value of the scene data of the elemental and composite object images included in the composite object image corresponding to the arbitrary node, or is a calculation of, as the composite scene data, one of the elemental and composite object images included in the composite object image corresponding to the arbitrary node.

In the system according to the fifth aspect, there is a picture image composition system according to a sixth aspect, in which the scene data include position data, and transformation data including geometrical transformation data, light source data and color transformation data.

In the system according to the first aspect, there is a picture image composition system according to a seventh aspect, in which the object composer comprises a scene data separator for outputting transformation data and position data which are generated from separating the scene data; an image processing unit for outputting a processed image generated from the object image data outputted from the first memory after image processing based on the transformation data; and a frame memory for storing the processed image based on the position data.

The objective of the present invention is achieved by a picture image composition system according to an eighth aspect, which is characterized in comprising: a first memory for storing information of each of elemental object images constituting an output image together with a first identification data group as a set of identification data for discriminating each of the object images; a second memory for storing scene information representing display information when each of the elemental object images is displayed as the output image, together with the first identification data group; a third memory for storing object structure information representing a hierarchical interposition of the elemental object images, composite image composed by the elemental object images and the output image as a tree structure in which the output image corresponds to a root, the composite object image to a node and the individual elemental object image to a leaf; a scene data composer for calculating, based on the tree structure represented by the object structure information, composite scene data as scene data of the composite object image corresponding to the node of the tree structure from scene data of the elemental object images and the composite object image included in the composite object image corresponding to the node of the tree structure, and for generating second identification data for discriminating the composite object image corresponding to the node of the tree structure, so as to output the scene data to be stored in the second memory together with the second identification data; a identification data extractor, based on the object structure information stored in the second memory, for generating third identification data to output and store in the first and second memories as identification data for discriminating the composite object image included in a target object image which is the composite object image or the output image respectively corresponding to arbitrary node or root, for generating a third identification data group to output and store in the first and second memories as identification data for discriminating the elemental object image included in the target object image, for generating fourth identification data to output and store in the second memory as identification data for discriminating the target object image, and for generating decision data for deciding as to whether the target object image corresponds to the node or the root in the tree structure so as to output the decision data to an object image transmitter; a scene data transformer for transforming composite scene data and scene data into a transform scene data group as a relative value to output it to an object composer, in which the composite scene data are that of the composite object image included in the target object image and are outputted from the second memory based on the third identification data, the scene data are that of the elemental object image included in the target object image and are outputted from the second memory based on the third identification data group, and the transform scene data group corresponds to the composite scene data of the target object image outputted from the second memory based on the fourth identification data; the object composer for generating composite image data including a composite image of the target object image to output it to the object image transmitter, based on the composite object image data, the elemental object image data and the transformation scene data group, in which the composite object image data include the composite object image included in the target object image and are outputted from the first memory based on the third identification data, in which the elemental object image data include the elemental object image included in the target object image and are outputted from the first memory based on the third identification data, and in which the transformation scene data group is outputted from the scene data transformer; the object image transmitter for outputting the composite image data to an image display unit in a first case where the decision data determine the target object image to be the output image corresponding to the root, and for outputting the composite image data as new object image to the first memory to be stored together with the identification data of the target object image in a second case where the identification data determine the target object image corresponding to the node: and wherein the first and second memories and the identification data extractor respectively input as target object identification data the identification data which are to identify as the target the elemental or composite object image which is selected by a user from the elemental or composite image constituting the output image; wherein, when the second memory receives required scene data which are required by the user to the target object image, the second memory rewrites the scene information of the target object image to the required scene data; wherein the identification data extractor generates fifth and sixth identification data, a fifth identification data group to input in the first and second memories and decision data to input the object image transmitter, in which the fifth identification data are to identify the composite object image included in the composite object image comprising of the target object image, the sixth identification data are to identify the composite object image consisting of the target object image, the fifth identification data group is to identify the elemental object image included in the composite object image comprising the target object image, and the decision data are to decide as to whether the composite object image comprising the target object image corresponds to the node or the root; wherein the scene data transformer transforms first and second required scene data into a transformation scene data group to output to the object composer, in which the first required scene data are the required scene data of the target object image or the scene data of the composite object image outputted from the second memory based on the fifth identification data, the second required scene data are the required scene data of the target object image or the scene data of the elemental object image outputted from the second memory based on the fifth identification data group, and the transformation scene data group has a relative value corresponding to composite scene data outputted from the second memory based on the sixth identification data for discriminating the composite object image comprising the target object image; wherein the object composer for generating object image of the composite object image to output it as composite image data to the object image transmitter based on first and second image data of the composite object or target object and the transformation scene data group, in which the composite image includes the composite object image comprising the target object image, the first image data are outputted from the first memory based on the fifth identification data, the second image data are outputted from the first memory based on the fifth identification data group, and the transformation scene group is outputted from the scene data transformer; and wherein the object image transmitter, based on the decision data, outputs the composite image data to the image display unit when the composite object image comprising the target object image corresponds to the root, and outputs composite image data as a new object image to the first memory to store them together with identification data of the composite object image of a upper rank when the composite object image comprising the target object image corresponds to the node: and the picture image composition system further comprising a partial tree generator to which the object structure data are inputted: wherein the first and second memories and the partial tree generator respectively input as target object identification data the identification data which are to identify as the target object image the elemental or composite object image which is selected by a user from the elemental or composite image constituting the output image; wherein, when the second memory receives required scene data which are required by the user to the target object image, the second memory rewrites the scene information of the target object image to the required scene data; wherein the partial tree generator generates partial object structure data representing a partial tree structure to store them in the third memory, in which the partial tree structure has a constitution in which a first tree structure consisting of the elemental object image one rank under the output image has no change, a second tree structure of the composite object image one rank under the output image and not constituting of the target object image changes to a first single composite object image having the composite object image and the composite scene data, and a third structure of the composite object image included in the composite object image comprising the target object image changes to a second single composite object image having the composite object image data and the composite scene data or required scene data; wherein the third memory rewrites the stored object structure data to the partial object structure data; wherein the identification data extractor generates eighth identification data of the composite object image comprising the target object image based on the partial object structure data so as to output the eighth identification data to the first and second memories, generates seventh identification data for discriminating the composite object image included in the composite object image comprising the target object image so as to output the seventh identification data to the first and second memories, generates a seventh identification data group as identification data for discriminating the composite object image comprising the target object image so as to output the seventh identification data group to the first and second memories, and generates decision data for deciding as to whether the composite object image comprising the target object image corresponds to the node or root in the object structure data so as to output the decision data to the object image transmitter; wherein the scene data transformer the first and second required scene data into a transformation scene data group to output to the object composer, in which the first required scene data are the required scene data of the target object image or the scene data of the composite object image outputted from the second memory based on the seventh identification data, the second required scene data are the required scene data of the target object image or the scene data of the elemental object image outputted from the second memory based on the seventh identification data group, and the transformation scene data group has a relative value corresponding to composite scene data outputted from the second memory based on the eighth identification data for discriminating the composite object image comprising the target object image; wherein the object composer generates a composite image of the composite object image to output it as composite image data to the object image transmitter based on first and second image data of the composite object or target object and the transformation scene data group, in which the composite image includes the composite object image comprising the target object image, the first image data are outputted from the first memory based on the seventh identification data, the second image data are outputted from the first memory based on the seventh identification data group, and the transformation scene group is outputted from the scene data transformer; and wherein the object image transmitter, based on the decision data, outputs the composite image data to the image display unit when the composite object image comprising the target object image corresponds to the root, and outputs composite image data as a new object image to the first memory to store them together with identification data of the composite object image of a upper rank when the composite object image comprising the target object image corresponds to the node.

There is a picture image composition system according to a ninth aspect, in the system according to the eighth aspect, having the scene data composer comprising: a fourth memory for storing the object structure data; a tree retriever for outputting the identification data of the elemental and composite object images included in the composite object image corresponding to an arbitrary node in the tree structure representing the object structure data, based on the object structure data, to the second memory, and for outputting the identification data as second identification data of the composite object image corresponding to the arbitrary node, to the second memory; and a scene data generator for calculating as composite scene data the scene data of the composite object image corresponding to the arbitrary node based on the scene data of the elemental and composite object images included in the composite object image corresponding to the arbitrary node which are outputted from the second memory.

In the system according to the ninth aspect, there is a picture image composition system according to a tenth aspect, in which the operation for calculating as the composite scene data the scene data of the composite object image corresponding to the arbitrary node, is a calculation of, as the composite scene data, a mean value of the scene data of the elemental and composite object images included in the composite object image corresponding to the arbitrary node, or is a calculation of, as the composite scene data, one of the elemental and composite object images included in the composite object image corresponding to the arbitrary node.

In the system according to the ninth aspect, there is a picture image composition system according to an eleventh aspect, in which the scene data include position data, and transformation data including geometrical transformation data, light source data and color transformation data.

In the system according to the eighth aspect, there is a picture image composition system according to a twelfth aspect, in which the object composer comprises a scene data separator for outputting transformation data and position data which are generated from separating the scene data; an image processing unit for outputting a processed image generated from the object image data outputted from the first memory after image processing based on the transformation data; and a frame memory for storing the processed image based on the position data.

Accordingly, the picture image composition system according to the present invention generates a composite object image from a set of an object image which is a component of the composite object image, and the corresponding scene data corresponding to the object image, thereby to store the composite object image as new component of the output image into the first memory. Furthermore, since the output image is generated from the reflexive generation of composite object image, when the user requires the transformation of the composite object image, the output image can be regenerated by using the composite object image stored in the first memory after the scene data of the composite object image stored in the second memory has been changed, thereby to reduce the processing.

BRIEF DESCRIPTION OF THE DRAWINGS

This and other objects, features and advantages of the present invention will become more apparent upon a reading of the following detailed description and drawings, in which.

DESCRIPTION OF THE EMBODIMENTS

Figure 7:
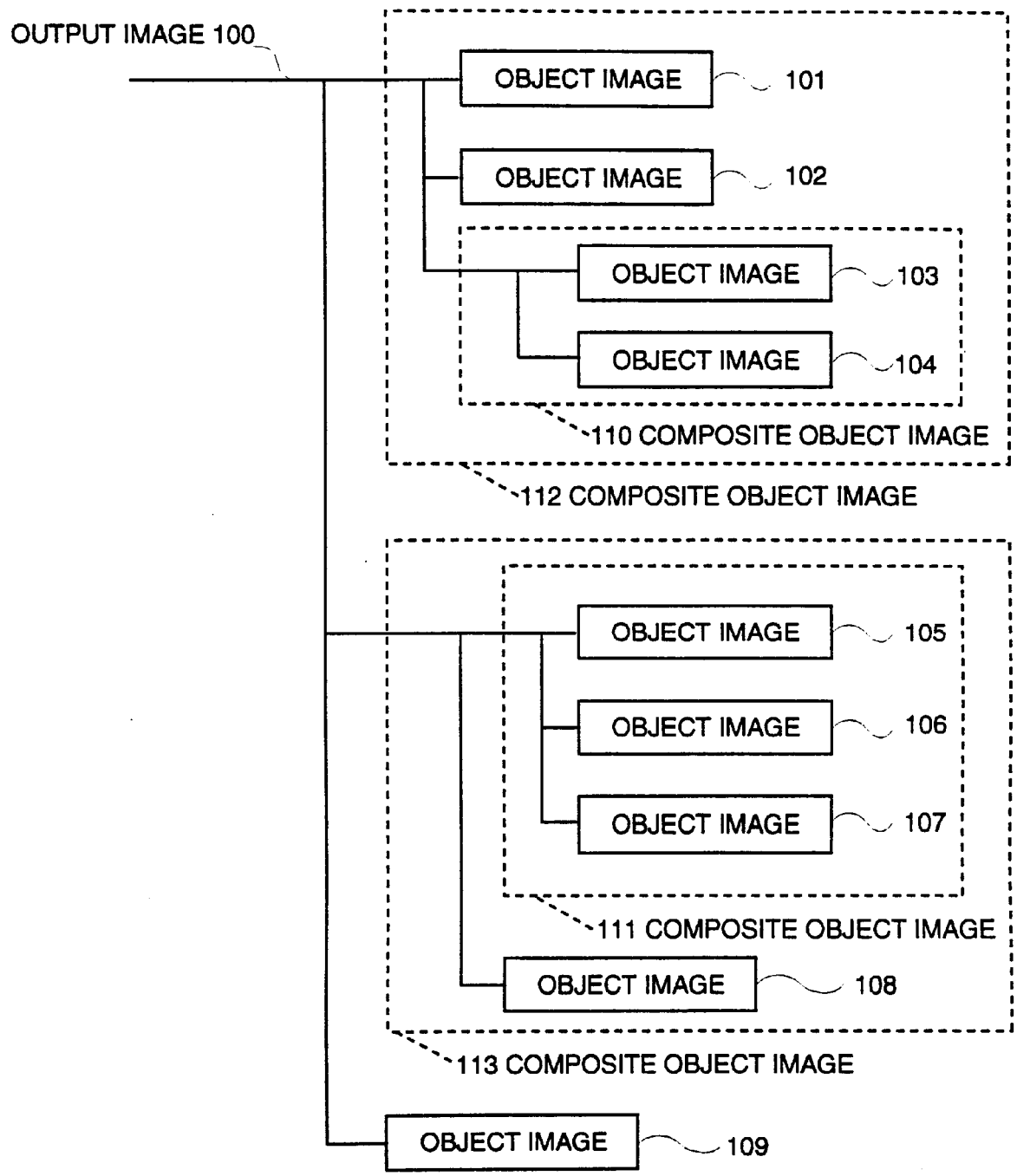
FIG. 7 is a tree diagram showing a hierarchical constitution of an object group treated in the first through third embodiments.

There will be described in detail the preferred embodiment of the picture image composition system according to the present invention with reference to attached drawings. FIG. 7 shows an example of a constitution of a superposed object images forming an output image. An output image 100 is generated by a superposition of object images 101–109, in which an object of a transformation requirement can include together a composite object image 110 including a partial composition of only object images 103 and 104, a composite object image 111 including a partial composition of only object images 105, 106 and 107, a composite image 112 including a partial composition of only object images 101, 102 and the composite object image 110, and a composite object image 113 including a partial composition of only the composite object image 111 and the object image 108. The output image 100 is generated by composing the composite object images 112 and 113 and the object image 109. Each of the object images 101–109 have identification information for discriminating corresponding image from other images, and corresponding scene information 201–209, respectively. In the preferred embodiments described below, there will be described as an example the output image including the superposition structure shown in FIG. 7.

Figure 1:
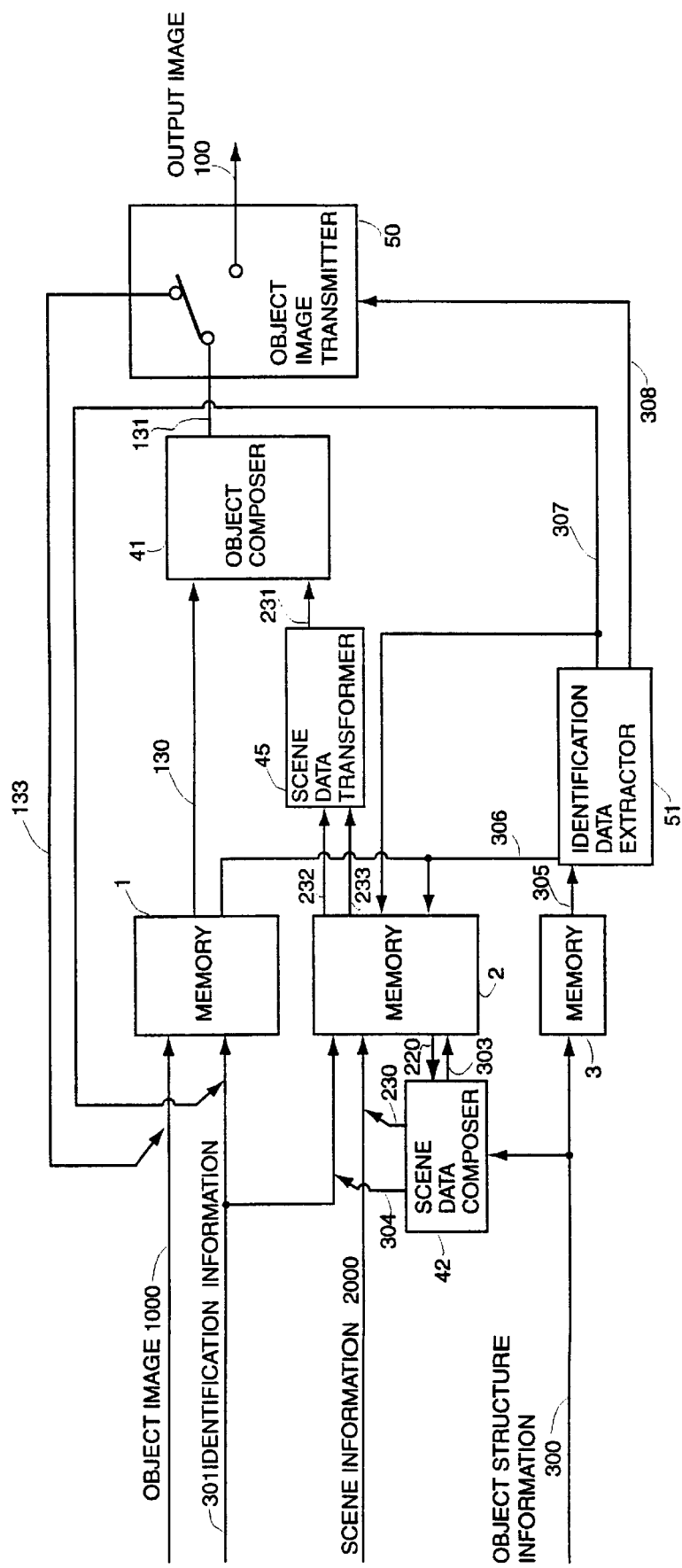
FIG. 1 is a block diagram showing a constitution of a first embodiment of a picture image composition system according to the present invention.

FIG. 1 is a block diagram showing a constitution of a first embodiment of the picture image composition system according to the present invention.

The picture image composition system according to the first embodiment includes a constitution for generating the output image based on an object image 1000, scene information 2000, identification information 301 and object structure information 300. The image composition system comprises a memory 1 storing the object image 1000 and identification information 301, a memory 2 storing the scene information 2000 and identification information 304, a memory 3 storing the object structure information 300, an object composer 41 for outputting a composite object image 131 based on the object image 130 and transformed scene information 231, a scene data composer 42 for composing scene information of the composite images included in the output image 100, a scene data transformer 45, an object image transmitter 50, and a identification data extractor 51.

Each of the object images 101–109 constituting the output image 100 may be called hereafter as an elemental object image. The elemental object images 101–109 are stored in the memory 1 as the object image 1000 together with the corresponding identification information 301. The scene information 201–209 respectively correspond to the elemental object images 101–109 to be gathered as the scene information 2000 which is stored in the memory 2 together with the corresponding identification information 301. The memory 3 stores the object structure information 300 denoting a relationship of the superposition of the object images 101–109. The object structure information 300 has a tree structure of the identification information of each of the object images, which is the same structure as that shown in FIG. 7. In the following description, an upper object image will be called as a parent object image, and a lower object image as a child object image.

Accordingly, in the above-described tree structure, several ranks are set in the manner that the output image has the uppermost rank, the elemental object images and composite object images included in the output image have the first lower rank immediately under the uppermost rank, the elemental object images and the composite object images included in the composite object images of the first lower rank have the second lower rank under two ranks of the uppermost rank, and so on. For example, in FIG. 7, the composite object image 112 is the parent object image of the composite object image 110, and object images 103 and 104 are the child object images of the composite object image 110. Furthermore, the term of the composite object image including the elemental object image/images has two means, namely, the composite object image consisting of the elemental object image/images, and the composite object image comprising the elemental object image/images. For instance, when the elemental object image 103 is considered as an example, the composite object image consisting of the elemental object image 103 is the composite object image 110, while the composite object images comprising the elemental object image 103 are the output image 100, and composite object images 112 and 110. In the same manner, the term of the composite object image including the composite object image/images has two means, namely, the composite object image insisting of the composite object image/images, and the composite object image comprising the composite object image/images. For instance, when the composite object image 111 is considered as an example, the composite object image consisting of the composite object image 111 is the composite object image 113, while the composite object images comprising the composite object image 111 are the output image 100 and the composite object image 113.

The picture image composite system according to the first embodiment generates the output image 100 after generating four composite object images 110–113 included in the object structure shown in FIG. 7 based on the object structure information 300. The scene data composer 42 generates the scene data 210–213 corresponding to the composite object images 110–113 before composing the output image 100.

Figure 4:
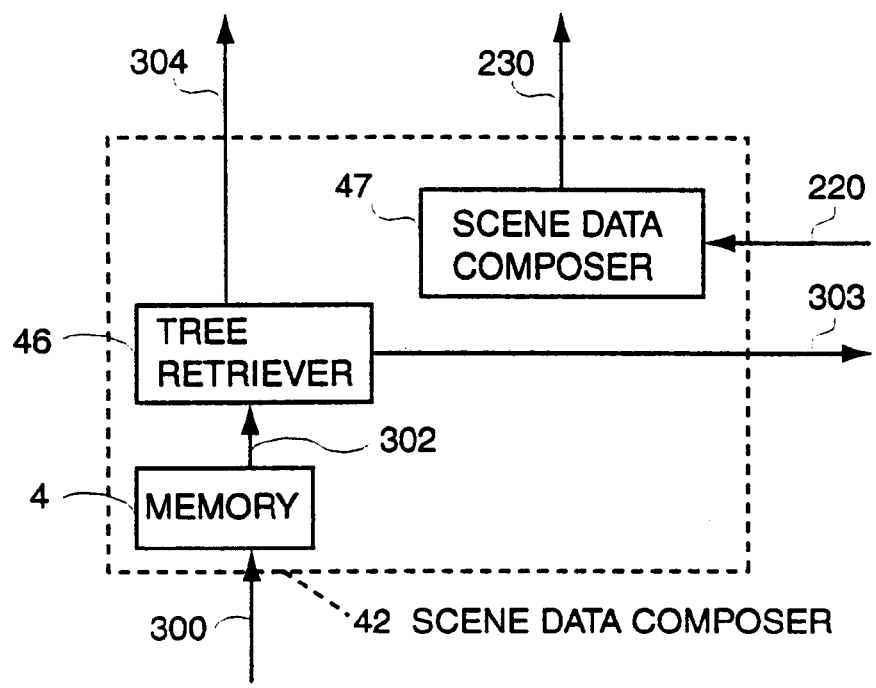
FIG. 4 is a block diagram showing a constitution of a scene data composer in the first through third embodiments.

FIG. 4 is a block diagram showing a constitution of the scene data composer 42. A memory 4 receives and stores the object structure information 300. A tree retriever 42 outputs identification data 303 representing a child object image included in the lowermost composite object image based on object structure data 302 stored in the memory 4, and further outputs identification data 304 which are newly allotted to a composite object image as an object. A scene data generator 47 receives scene data 220 corresponding to the identification data 303 representing the child object image, and generates scene data 230 of the composite object image corresponding to the identification data 304 which are newly allotted to the composite object image as the object. There is a method of generating the scene data 230 of the composite object image, in which the generator outputs a mean of the scene data of the child object images or representative scene data of one image of the child object images. The scene data 230 are stored in the memory 2 together with the identification data 304. When the generator completes a generation of the scene data of one composite object image, the tree retriever 46 retrieves object structure data 302 corresponding to a partial tree of the object structure data stored in the memory 4 except the identification data 303, and the same operation as above is performed. The scene data composer 42 repeats the above-described operation to generate the scene data 210–213 of four composite object images 110–113 shown in FIG. 7.

When the scene data composer 42 finishes the generation of the scene data 210–213, a identification data extractor 51 refers to object structure data 305 stored in the memory 3 in order to allot identification data 307 to the composite object images 110–113 and the output image 100 as an object of a composition, so as to output identification data 306 of the child object image included in these composite object images. Furthermore, the identification data extractor 51 outputs decision data 308 as to whether or not the object image as an object represents the output image itself. The picture image composition system according to the first embodiment generates a composite image 131 representing the composite object image including the child object images based on the object images and corresponding scene data of the child object images included in the composite object images as an object. After that, the system determines in accordance with the decision data 308 as to whether the composite image 131 should be stored in the memory 1 as the composite object image 110–113 or transmitted into an output image display unit as the output image 100, and repeats these steps with respect to the output image 100. There will be described hereunder a generation of the composite image 131 in each of the steps.

First, there is described an operation of the identification data extractor 51. The Extractor 51 extracts the identification data 307 of the composite object image 110 which is one of the composite object images in the lowermost rank, and the identification data 306 for discriminating the child object images 103 and 104 in the composite object image 110, based on the object structure data 305 issued from the memory 3. Next, the memory 2 receives the identification data 307 representing the composite object image 110 to extract the scene data 232 of the image 110 from the memory 2 to a scene data transformer 45. Then, the memory 1 receives the identification data 306 for discriminating the child object images 103 and 104 to extract the object images 103 and 104 from the memory 1 so a to output the object image 130 as the child object images 103 and 104 to an object composer 41. The memory 2 also receives the identification data 306 to extract the scene data 203 and 204 of the object images 103 and 104 from the memory 2, so as to output scene data 233 as the scene data 203 and 204 to the scene data transformer 45. The scene data transformer 45 converts the scene data 233 into a relative value to the scene data 232 to transmit relative scene data 231 to the object composer 41. The object composer 41 receives the object image 130 and the relative scene data 231 to generate the composite image 131.

Figure 5:
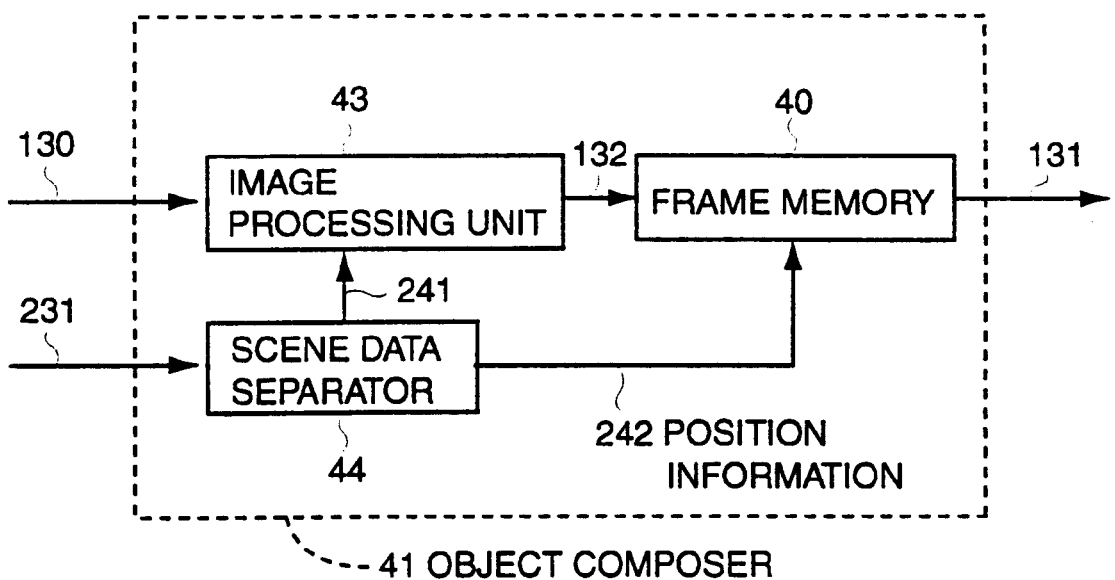
FIG. 5 is a block diagram showing a constitution of an object image composer in the first through third embodiments.

FIG. 5 is a block diagram showing a constitution of the object composer 41. In the figure, a scene data separator 44 separates the relative scene data 231 into transformation data 241 and position data 242. An image processing unit 43 performs a various kinds of transformation to the object image 130 in accordance with the transformation data 241. Contents of the transformation can be considered as a geometrical transformation such as an Affin transformation including an expansion/reduction and revolution, a perspective transformation and image distortion; a luminance transformation such as a fade-in/fade-out and shadowing to other objects; a color transformation in which a specified color in the image is caused to be changed; and a frequency processing such as a filtering by a low-pass filter. A transformed object image 132 is written in a frame memory 40 in accordance with the position data 242.

The object composer 41 generates the composite image 131 by writing the object images 103 and 104 which are transmitted as the object image 130 when the identification data extractor 51 selects the composite object image 110 as the lowermost rank composite object image based on the object structure data 305 outputted from the memory 3. The object image transmitter 50 transmits the composite image 131 as the composite object image 133 to the memory 1 in accordance with the identification data 308. The memory 1 stores the composite object image 133 as the composite object image 110 in accordance with the identification data 307.

When the memory 1 completes to store the composite object image 110, the identification data extractor 51 refers to the object structure data 305 stored in the memory 3. In this case, since an operation to the composite object image 110 is completed, the identification data extractor 51 outputs the identification data 307 representing the composite object image 111, the identification data 306 for discriminating the child object images 105, 106 and 107 included in the composite object image 111, and the decision data 308 with respect to the composite object image 111. Scene data 211 of the composite object image 111 are extracted from the memory 2 based on the identification data 307 representing the composite object image 111 to output the data 211 as the scene data 232 to the scene data transformer 45. After that, since the identification data 306 are issued to the memory 1 as the identification data of the child object images 105, 105 and 107 included in the composite object image 111, the object images 105, 106 and 107 are extracted from the memory 1 to output them as the object image 130 to the object composer 41.

Furthermore, scene data 205, 206 and 207 of the object images 105, 106 and 107 are extracted from the memory 2 based on the identification data 306 to output them as the scene data 233 to the scene data transformer 45. The scene data 233 are transformed by the transformer 45 into the relative value corresponding to the scene data 232 to output them as relative scene data 231 to the object composer 41. The object composer 41 receives the relative scene data 231 and the object image 130 as a set of the object images 105, 106 and 107, and generates a composite image 131 of the object images 105, 106 and 107 in the same manner as the above-described method. The object image transmitter 51 transmits the composite image 131 as the composite object image 133 to the memory 1 in accordance with the decision data 308. The memory 1 stores the composite object image 133 as the composite object image 111 in accordance with the identification data 307.

After the composite object image 133 is stored as the composite object image 111 in the memory 1, composite object images 112 and 113 are selected as the next composite object image by an operation of the identification data extractor 51. Here, in the case that the extractor 51 selects the composite object image 112, the composite object image 112 is generated from the object images 101 and 102 and the composite object image 110 to be stored in the memory 1. After that, since the identification data extractor 51 selects the composite object image 113, the extractor 51 generates the composite object image 113 from the composite object image 111 and the object image 108 to store the image 113 in the memory 1.

At last, the identification data extractor 51 outputs the identification data 307 corresponding to the output image 100, and the identification data 306 corresponding to the composite object image 112 and 113 and the object image 109 which constitute the output image 100. After that, the composite object images 112 and 113 and the object image 109 are extracted from the memory 1 based on the identification data 306, and are outputted to the object composer 41 as the object image 130. Scene data 233 are extracted from the memory 2 to the scene data transformer 45 in accordance with the identification data 306, the scene data 233 which include scene data 212 of the of the composite object image 112, the scene data 213 of the composite object image 113 and the scene data 209 of the object image 109. Since the identification data 307 represent the output image 100, the scene data transformer 45 transmits the scene data 233 itself as the relative scene data 231 to the object composer 41. The object composer 41 receives the object image 130 and the relative scene data 231, and generates the composite image 131 of the composite object images 112 and 113 and the object image 109 in accordance with the above-described method. The object image transmitter 51 transmits the composite image 131 as the output image 100 to the display unit with reference to the decision data 308.

According to the picture image composition system of the first embodiment, since the memory 1 stores four object images 110–113 constituting the output image shown in FIG. 7, it is possible to reuse these images as one object image. For example, in the case where the output image is newly generated by superposing another object image which is newly transmitted, on the composite object image 113, the picture image composite system may use the composite object image 113 stored in the memory 1. Furthermore, in the case where the output image is recomposed by transforming certain object image in the output image, the picture image composition system can reduce the number of processing to a recomposition by using the composite object images 110–113.

Figure 2:
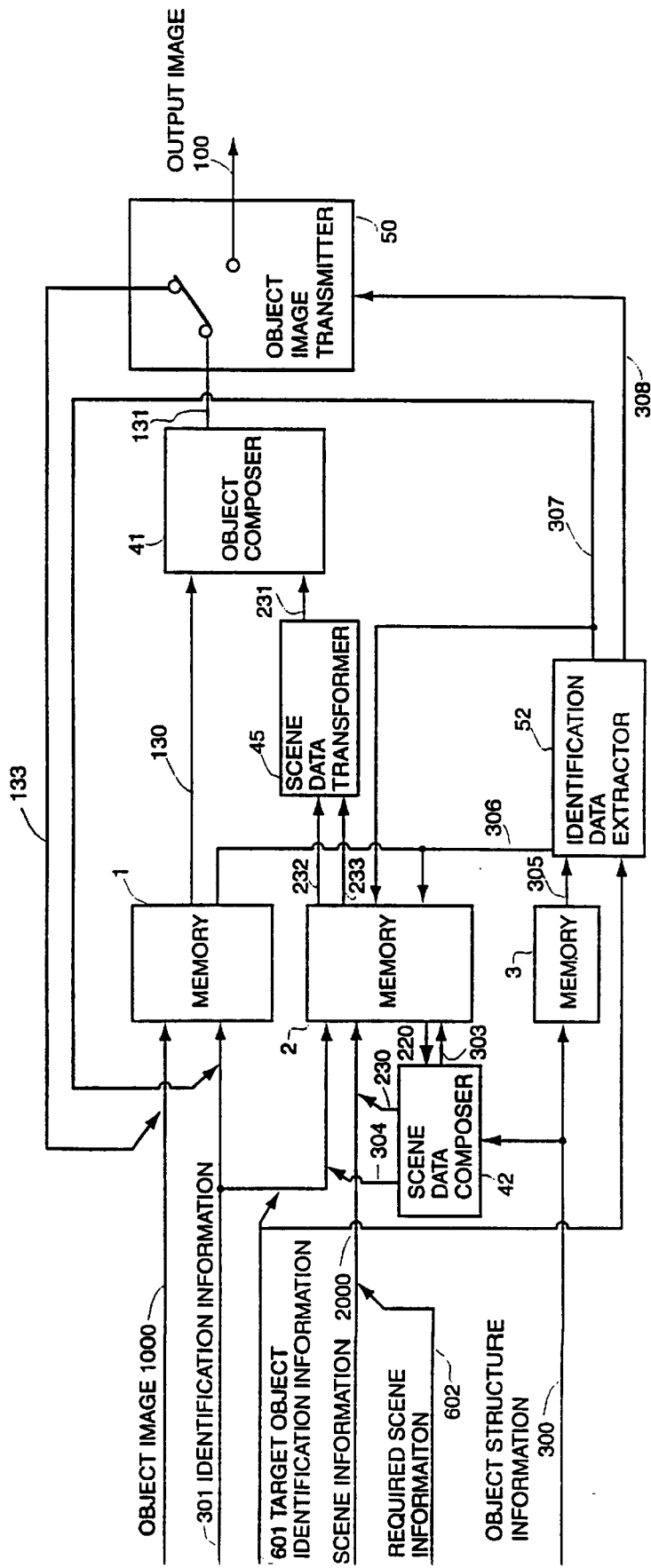
FIG. 2 is a block diagram showing a constitution of a second embodiment of a picture image composition system according to the present invention.

FIG. 2 is a block diagram showing a constitution of the picture image composition system according to the second embodiment of the present invention. Also in the description of the second embodiment, the structure of the elemental object images constituting the output image is the same as that shown in FIG. 7.

The picture image composition system according to the second embodiment generates the output image 100 processed by a transformation which is required by the user, after receiving target object identification data 601 and required scene data 602 in addition to an object image 1000, scene information 2000, identification information 301, object structure information 300: in which the data 601 is to identify the object selected by the user; the data 602 is to specify the transformation required by the user; the object image 1000 is a set of the object images 101–109; the scene information 200 is a set of the scene data corresponding to the object images 101–109; the identification information is a set of identification data doe discriminating the object images 101–109; and the object structure information 300 is to represent the structure of the object images shown in FIG. 7. Furthermore, the system in the second embodiment comprises a identification data extractor 52 in place of the identification data extractor 51 in the system according to the first embodiment.

Figure 6:
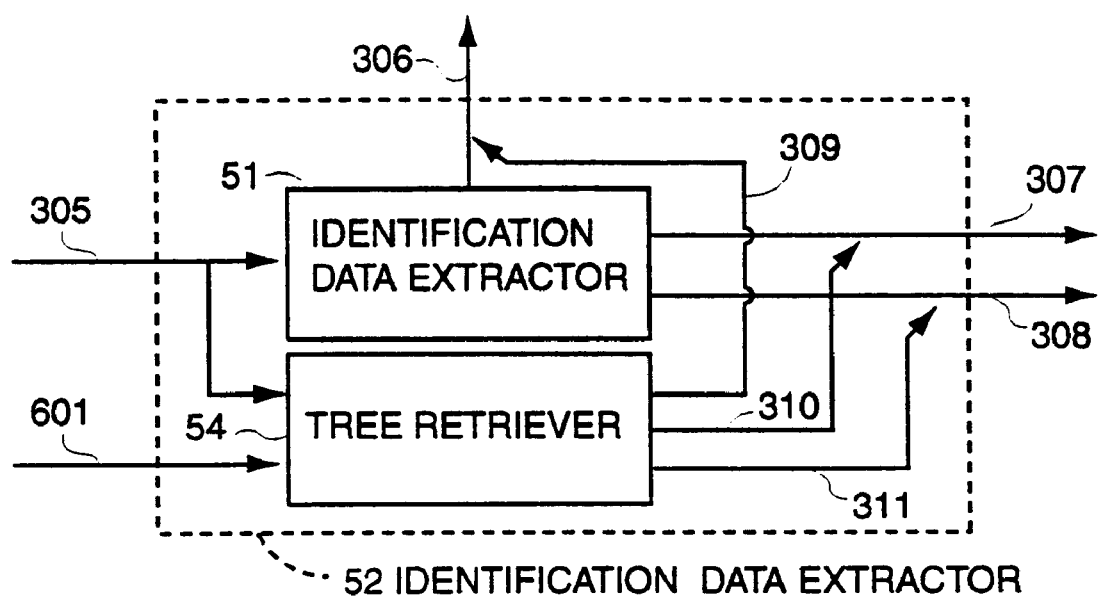
FIG. 6 is a block diagram showing a identification data extractor in the second embodiment.

FIG. 6 is a block diagram showing the constitution of the identification data extractor 52. In the figure, the identification data extractor 52 comprises a tree retriever 54 and the identification data extractor 51 having the same constitution as the system of the first embodiment comprises.

The picture image composition system according to the second embodiment receives the object images 101–109 as the object image 1000 to store the images in the memory 1 together with the corresponding identification information 301. The system also receives as the scene information 2000 the scene data 201–209 corresponding the object images 101–109 to store the data in the memory 2 together with the corresponding identification information. Furthermore, the system stores the object structure information 300 in the memory 3. The system according to the second embodiment first generates the output image 100 by hierarchically composing the object images 101–109 in accordance with the same method described in the picture image composition system according to the first embodiment, before the user specifies the transformation.

Then, when the picture image composition system according to the second embodiment receives the required scene data 602 and target object identification data 601 which are specified by the user, the system transmits the required scene data 602 in the memory 2 together with the target object identification data 601. The memory 2 rewrites the scene data to the required scene data 602 with respect to the object image which is specified by the target object identification data 601.

Here, there will be described an example that the target object identification information 601 specified by the user is the object image 101 shown in FIG. 7. At first, the scene data 201 stored in the memory 2 are rewritten to the required scene data 602. Next, when the tree retriever 54 in the identification data extractor 52 receives the target object identification data 601, the retriever 54 refers to the object structure data 305 stored in the memory 3 to output the identification data 310 and 309 and decision data 311, as shown in FIG. 7, in which the data 310 represent the composite object image 112 as a parent of the object image 101, and the data 309 are the identification data representing the object images 101 and 102 and the composite object image 110 which are included in the composite object image 112. As the same as the identification data 306 shown in FIG. 2, the identification data 309 are inputted in the memories 1 and 2; as the same as the identification data 307 shown in FIG. 2, the identification data 310 representing the composite object image 112 as the parent of the object image 101 are also inputted in the memories 1 and 2; and as the same as the decision data 308 shown in FIG. 2, the decision data 311 are inputted in the object image transmitter 50. Since the picture image composition system according to the second embodiment uses the identification data 309 and 310 and decision data 311 which have the same part as the above-described system of the first embodiment has, the system of the second embodiment generates the composite image 131 including the object images 101 and 102 and the composite object image 110 in accordance with the object composition method having the same operation as that in the first embodiment. The object image transmitter 50 transmits the composite image 131 as the composite object image 133 to the memory 1 based on the decision data 311, so as to newly store in the memory 1 the composite object image 112 to which the object image 101 is transformed by the required scene data.

When the composite object image 112 has been stored in the memory 1, the identification data extractor 52 refers to the object structure data 305 stored in the memory 3 to output the identification data 307 and 306 and decision data 308, in which the data 307 represent the output image as a parent of the composite object image 112 which has been an object of the recomposition, and the data 306 represent the composite object images 112 and 113 and the elemental object image 109 which are included in the output image 100. In the same manner of the above-described object composition method, the object composer 41 generates the composite image 131 including the composite object images 112 and 113 and the object image 109. The object image transmitter 50 transmits the composite image 131 as the output image 100 to the display unit based on the decision data 308, thereby to obtain the output image 100 to which a transformation is added in accordance with the required scene data 602.

Next, there is an example in the case where the target object identification data 601 selected by the user represent the composite object image 112 shown in FIG. 7 in the second embodiment. At first, the scene data 201 stored in the memory 2 are rewritten to the required scene data 602. When the identification data extractor 52 receives target object identification data 601, the extractor 52 refers to the object structure data 305 stored in the memory 3 to output the identification data 307 and 306 and decision data 308, in which the data 307 represent the output image 100 as a parent of the composite object image 112, and the data 306 are to represent the composite object images 112 and 113 and the elemental object image 109 which are included in the output image 100. The object composer 41 generates the composite including the composite object images 112 and 113 and the elemental object image 109 in the same manner as that of the above-described object composition method. The object image transmitter 50 transmits the composite image 131 as the output image 100 to the image display unit based on the decision data 308, thereby to obtain the output image 100 of which the composite object image 112 is processed by a transformation based on the required scene data 602.

In accordance with the system of second embodiment, in the case where the user specifies the transformation on certain object image/images constituting the output image, since the system can regenerates the output image by rewriting the scene data stored in the memory 2 and by reflexively generating the composite object image based on the rewritten scene data, it is possible to reduce the number of processing of the transformation.

Figure 3:
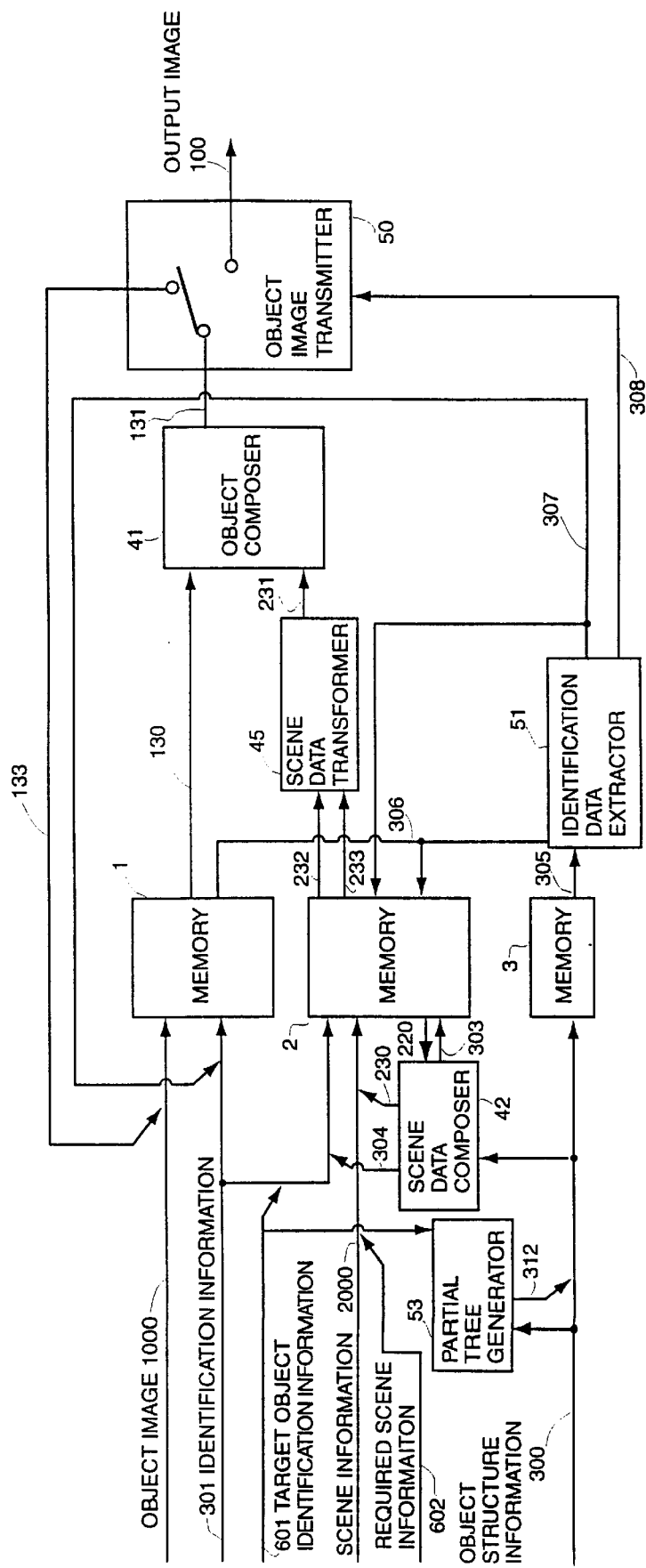
FIG. 3 is a block diagram showing a constitution of a third embodiment of a picture image composition system according to the present invention.

FIG. 3 is a block diagram showing the constitution of a picture image composition system according to the third embodiment of the present invention. In the description of the third embodiment, it is also considered that individual elemental object image constituting the output image has the constitution shown in FIG. 7. The system according to the third embodiment has the constitution different from that of the second embodiment in the picture image composite system performing the transformation which is required by the user to one of the object images shown in FIG. 7.

The picture image composition system receives the object images 101–109 as the object image 1000 and stores them in the memory 3 together with the identification data 301 corresponding thereto. Furthermore, the system receives the scene data 201–209 of the object image 101–109 as the scene information 2000 to store them in the memory 2 together with the identification data 301 corresponding thereto. Moreover, the system stores the object structure information 300 in the memory 3. The picture image composition system according to the third embodiment comprises a partial tree generator 53 in addition to entire components included in the system according to the first embodiment.

Before the user specifies the transformation, the picture image composition system first generates the output image 100 by hierarchically composing the object images 101–109 in the same manner as the composition system according to the first embodiment.

Next, there is described the operation in the case where the user requires the transformation by specifying certain object image included in the output image. The example is the operation in the case where the target object identification data 601 for discriminating the specified object image represent the object image 101 shown in FIG. 7. At first, the scene data 201 stored in the memory 2 are rewritten to the required scene data 602. Then, the partial tree generator 53 generates the partial object structure data 312 as a partial tree of the object structure information 300 based on the target object identification data 601.

Figure 8:
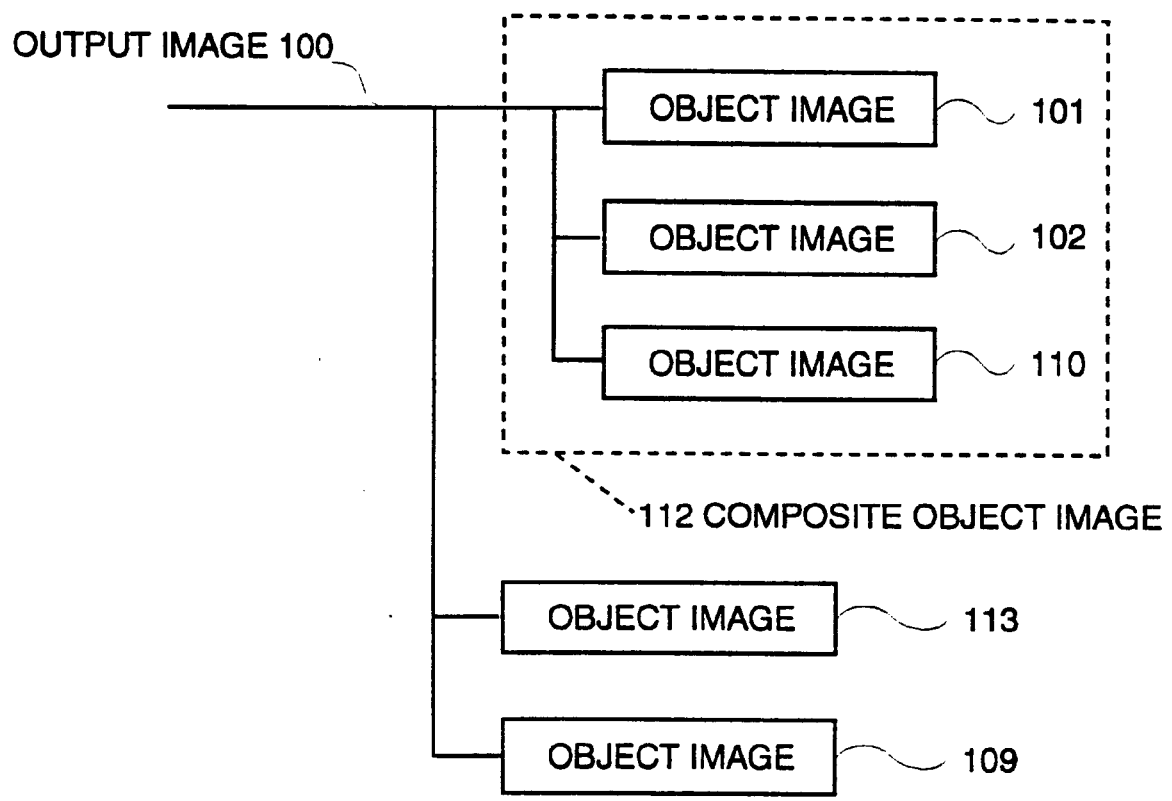
FIG. 8 is a tree diagram showing object constitution data generated by a partial tree generator in the third embodiment.
Figure 9:
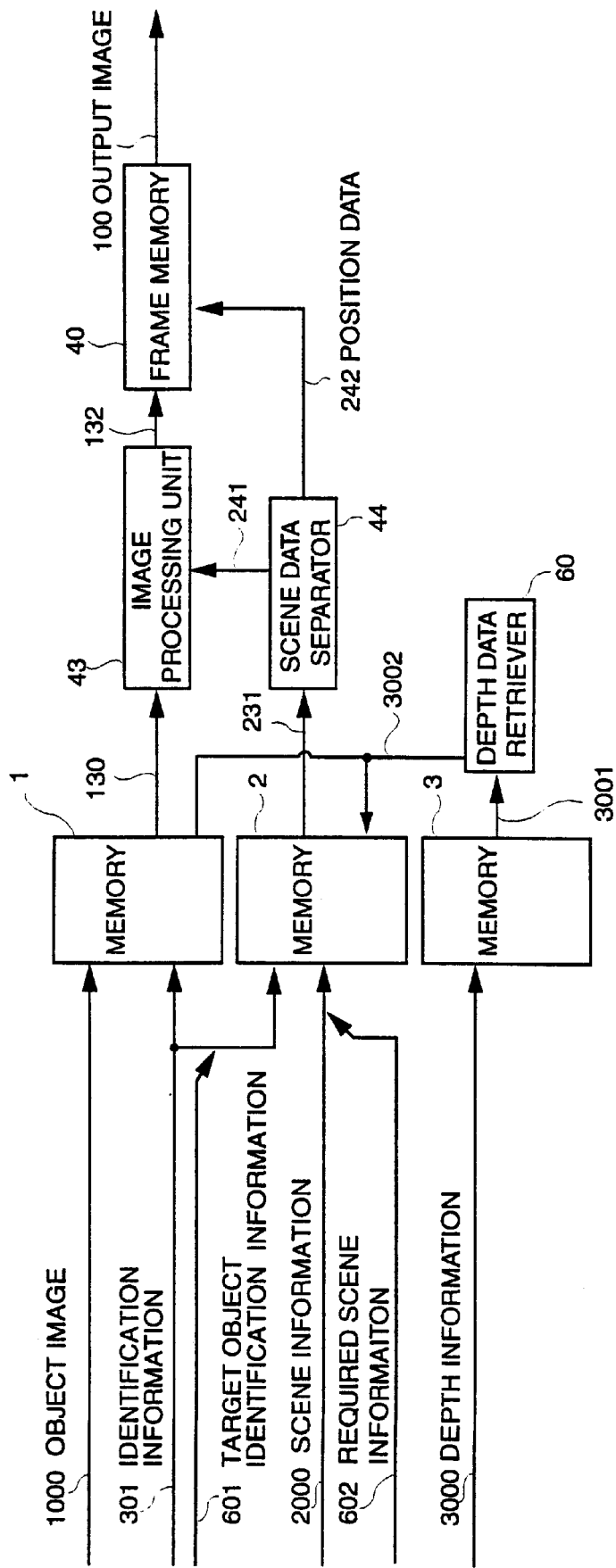
FIG. 9 is a block diagram showing a constitution of the conventional picture image composition system.

FIG. 8 shows a tree structure of partial object structure data 312 issued from the partial tree generator 53, a tree structure which may be called as a partial tree structure. The partial tree structure in the case where the target object image shown in FIG. 8 is the object image 101, is that the structure of the elemental object image 109 as one rank under the output image 100 is not changed, that the composite object image 113 which does not include the target object image (101) in the composite object images 112 and 113 is changed to the single composite object image 113 having the composite object image data and the composite scene data, and that the composite included in the composite object image 112 which includes the target object image 101 is changed to the single composite object image including the composite object image and the composite scene image. The memory 3 inputting the partial object structure data 312 erases the object structure information 300 stored therein, and newly stores the inputted partial object structure data 312. The identification data extractor 51 refers to the partial object structure data 305, and outputs the identification data 307 representing the composite object image 112, the identification data 306 representing the child object images 101 and 102 and the composite object image 110 all of which are included in the composite object image 112, and decision data 308. After that, in the same manner as that of the recomposition of the output image in the second embodiment, the composite object image 112 after the transformation of the scene data of the object image 101, is regenerated for the regeneration of the output image 100.

Even though there has been described the case where the specific object image within the object image shown in FIG. 7 is specified by the user as the transformed object image in the second and third embodiments, it is possible for the case where the transformation is performed to the other object image/images to obtain the output image required by the user by means of the sequentially recomposition of the object images including the object image as the target.

Even though the system according to the first through third embodiments has rewritten the entire contents in the frame memory for regenerating the composite image corresponding to the requirement of the transformation, it is possible to limit the position where the frame memory should be rewritten, within the regions where the object image as the target occupies before and after the transformation. In this case, parts where the region occupied by the object before the transformation does not interposed over the region after the transformation, are first occupied by objects of which the transformation is not required by the user, and then the object after the transformation is rewritten in the frame memory.

There will be described in detail the effect of the picture image composition system according to the present invention when the transformation is performed over the object image in the output image in comparison with the conventional image composition system.

In the case where the transformation is added to the composite object image 112 included in the output image 100, the picture image composition system according to the second and third embodiment needs only the change of the scene data 212 and 213. On the contrary, in the conventional image composition system, it is necessary to change the scene data 201, 202, 203 and 204 respectively corresponding to the object images 101, 102, 103 and 104. Accordingly, it is possible for the image composition system of the second and third embodiments to reduce the number of processing to one fourth transformation in comparison with the conventional image composition system.

Further, the conventional image composition system has the number of the pixels written on the frame memory, which is a sum of pixels of the object images 101–109. On the contrary, in the picture image composition system according to the second and third embodiments of the present invention, the number of the pixels written on the frame memory is a sum of the number of the pixels of the composite object images 112 and 113 and the object image 109. If $c_1$–$c_8$ are supposed in the order as the pixels of portions hidden by the other object images in the object images 101–108 forming the composite object images, the following equations can be established between the numbers of the pixels of the object images 101–108 and those of the composite images 112 ad 113 because the composite object images 112 and 113 and the object image 109 are not interposed with each other:

$P112 = P101 - c_1 + P102 - c_2 + P103 - c_3 + P104 - c_4$ $P113 = P105 - c_5 + P106 - c_6 + P107 - c_7 + P108 - c_8$ where the number of the pixels of the object image 101–108 and the composite object images 112 and 113 are represented by P101–P108, P112 and P113. Accordingly, the picture image composition system according to the second embodiment of the present invention can decrease the processing time corresponding to the elimination of writing the data with pixels of c1+c2+ . . . +c8 in comparison with the conventional image composition system.

As has been clearly described above, in the case where the user reuses a part of the image/images within the output image, the processing amount can be reduced. More particularly, when the user requires a kind of several transformation such as a position change, geometrical transformation and luminance transformation to the object image, it is possible to provide the picture image composition system capable of reducing the number of the transformation to the object image and the processing amount when the object images are written in the frame memory.

The entire disclosure of Japanese Application No.8-350193 filed on Dec. 27, 1996 including specification, claims, drawing and summary are incorporated herein by reference in its entirety.

What is claimed is:

1. A picture image composition system comprising:

a first memory for storing information of each of elemental object images constituting an output image together with a first identification data group as a set of identification data for discriminating each of said object images;

a second memory for storing scene information representing display information when each of said elemental object images is displayed as said output image, together with said first identification data group;

a third memory for storing object structure information representing a hierarchical interposition of said elemental object images, composite image composed by said elemental object images and said output image as a tree structure in which said output image corresponds to a root, said composite object image to a node, and individual elemental object image to a leaf;

a scene data composer for calculating, based on said tree structure represented by said object structure information, composite scene data as scene data of said composite object image corresponding to said node of the tree structure from scene data of said elemental object images and composite object image included in said composite object image corresponding to said node of said tree structure, and for generating second identification data for discriminating said composite object image corresponding to said node of said tree structure, so as to output said scene data to be stored in said second memory together with said second identification data;

an identification data extractor, based on said object structure information stored in said second memory, for generating third identification data to output and store in said first and second memories as identification data for discriminating said composite object image included in a target object image which is said composite object image or said output image respectively corresponding to arbitrary node or root, for generating a third identification data group to output and store in said first and second memories as identification data for discriminating said elemental object image included in said target object image, for generating fourth identification data to output and store in said second memory as identification data for discriminating said target object image, and for generating decision data for deciding as to whether said target object image corresponds to said node or said root in said tree structure so as to output said decision data to an object image transmitter;

a scene data transformer for transforming composite scene data and scene data into a transform scene data group as a relative value to output it to an object composer, in which said composite scene data are that of said composite object image included in said target object image and are outputted from said second memory based on said third identification data, said scene data are that of the elemental object image included in the target object image and are outputted from said second memory based on said third identification data group, and said transform scene data group corresponds to said composite scene data of said target object image outputted from said second memory based on said fourth identification data;

said object composer for generating composite image data including a composite image of said target object image to output it to said object image transmitter, based on said composite object image data, said elemental object image data and said transformation scene data group, in which said composite object image data include said composite object image included in the target object image and are outputted from said first memory based on said third identification data, in which said elemental object image data include said elemental object image included in said target object image and are outputted from said first memory based on said third identification data, and in which said transformation scene data group is outputted from said scene data transformer; and said object image transmitter for outputting said composite image data to an image display unit in a first case where said decision data determine said target object image to be said output image corresponding to said root, and for outputting said composite image data as a new object image to said first memory to be stored together with said identification data of said target object image in a second case where the identification data determine said target object image corresponding to said node.

2. The picture image composition system according to claim 1, wherein said first and second memories and said identification data extractor respectively input as target object identification data the identification data which are to identify as the target said elemental or composite object image which is selected by a user from the elemental or composite image constituting the output image;

wherein, when the second memory receives required scene data which are required by the user to said target object image, the second memory rewrites the scene information of said target object image to said required scene data;

wherein said identification data extractor generates fifth and sixth identification data, a fifth identification data group to input in the first and second memories and decision data to input the object image transmitter, in which said fifth identification data are to identify the composite object image included in the composite object image comprising of the target object image, said sixth identification data are to identify said composite object image consisting of said target object image, said fifth identification data group is to identify said elemental object image included in said composite object image comprising said target object image, and said decision data are to decide as to whether said composite object image comprising said target object image corresponds to said node or said root;

wherein said scene data transformer transforms first and second required scene data into a transformation scene data group to output to said object composer, in which said first required scene data are said required scene data of said target object image or said scene data of said composite object image outputted from said second memory based on said fifth identification data, said second required scene data are said required scene data of said target object image or said scene data of said elemental object image outputted from said second memory based on said fifth identification data group, and said transformation scene data group has a relative value corresponding to composite scene data outputted from said second memory based on said sixth identification data for discriminating said composite object image comprising said target object image;

wherein said object composer for generating object image of said composite object image to output it as composite image data to said object image transmitter based on first and second image data of said composite object or said target object and said transformation scene data group, in which said composite image includes said composite object image comprising said target object image, said first image data are outputted from said first memory based on said fifth identification data, said second image data are outputted from said first memory based on said fifth identification data group, and said transformation scene group is outputted from said scene data transformer; and wherein said object image transmitter, based on said decision data, outputs said composite image data to said image display unit when said composite object image comprising said target object image corresponds to the root, and outputs composite image data as a new object image to said first memory to store them together with identification data of said composite object image of an upper rank when the composite object image comprising the target object image corresponds to said node.

3. The picture image composition system of according to claim 1, further comprising:

a partial tree generator to which said object structure data are inputted:

wherein said first and second memories and said partial tree generator respectively input as target object identification data said identification data which are to identify as said target object image said elemental or composite object image which is selected by a user from said elemental or composite image constituting the output image;

wherein, when the second memory receives required scene data which are required by the user to said target object image, said second memory rewrites said scene information of said target object image to said required scene data;

wherein said partial tree generator generates partial object structure data representing a partial tree structure to store them in said third memory, in which the partial tree structure has a constitution in which a first tree structure consisting of the elemental object image of one rank under said output image has no change, a second tree structure of said composite object image of one rank under said output image and not constituting of said target object image changes to a first single composite object image having said composite object image and said composite scene data, and a third structure of said composite object image included in said composite object image comprising said target object image changes to a second single composite object image having said composite object image data and said composite scene data or required scene data;

wherein said third memory rewrites the stored object structure data to said partial object structure data;

wherein said scene data transformer transforms said first and second required scene data into a transformation scene data group to output to said object composer, in which said first required scene data are said required scene data of said target object image or said scene data of said composite object image outputted from said second memory based on a seventh identification data, said second required scene data are the required scene data of said target object image or said scene data of said elemental object image outputted from said second memory based on said seventh identification data group, and said transformation scene data group has a relative value corresponding to composite scene data outputted from an second memory based on said eighth identification data for discriminating said composite object image comprising said target object image;

wherein said object composer generates a composite image of said composite object image to output it as composite image data to said object image transmitter based on first and second image data of said composite object or said target object and said transformation scene data group, in which said composite image includes said composite object image comprising said target object image, said first image data are outputted from said first memory based on said seventh identification data, said second image data are outputted from said first memory based on said seventh identification data group, and said transformation scene group is outputted from said scene data transformer; and wherein said object image transmitter, based on said decision data, outputs said composite image data to said image display unit when said composite object image comprising said target object image corresponds to said root, and outputs composite image data as a new object image to said first memory to store them together with identification data of said composite object image of an upper rank when said composite object image comprising said target object image corresponds to said node.

4. The picture image composition system according to claim 1, wherein said scene data composer comprises:

a fourth memory for storing said object structure data;

a tree retriever for outputting said identification data of said elemental and composite object images included in said composite object image corresponding to an arbitrary node in said tree structure representing said object structure data, based on said object structure data, to said second memory, and for outputting said identification data as second identification data of said composite object image corresponding to said arbitrary node, to said second memory; and a scene data generator for calculating as composite scene data said scene data of said composite object image corresponding to said arbitrary node based on said scene data of said elemental and composite object images included in said composite object image corresponding to said arbitrary node which are outputted from said second memory.

5. The picture image composition system according to claim 4, wherein:

operation for calculating as said composite scene data said scene data of said composite object image corresponding to said arbitrary node, is a calculation of, as said composite scene data, a mean value of said scene data of said elemental and composite object images included in said composite object image corresponding to said arbitrary node, or is a calculation of, as said composite scene data, one of said elemental and composite object images included in said composite object image corresponding to said arbitrary node.

6. The picture image composition system according to a claim 5, wherein:

said scene data include position data, and transformation data including geometrical transformation data, light source data and color transformation data.

7. The picture image composition system according to claim 1, wherein said object composer comprises:

a scene data separator for outputting transformation data and position data which are generated from separating said scene data;

an image processing unit for outputting a processed image generated from said object image data outputted from said first memory after image processing based on said transformation data; and a frame memory for storing processed image based on said position data.

8. A picture image composition system comprising:

a first memory for storing information of each of elemental object images constituting an output image together with a first identification data group as a set of identification data for discriminating each of said object images;

a second memory for storing scene information representing display information when each of said elemental object images is displayed as said output image, together with said first identification data group;

a third memory for storing object structure information representing a hierarchical interposition of said elemental object images, composite image composed by said elemental object images and said output image as a tree structure in which said output image corresponds to a root, said composite object image to a node, and individual elemental object image to a leaf;

a scene data composer for calculating, based on said tree structure represented by said object structure information, composite scene data as scene data of said composite object image corresponding to said node of the tree structure from scene data of said elemental object images and composite object image included in said composite object image corresponding to said node of said tree structure, and for generating second identification data for discriminating said composite object image corresponding to said node of said tree structure, so as to output said scene data to be stored in said second memory together with said second identification data;

an identification data extractor, based on said object structure information stored in said second memory, for generating third identification data to output and store in said first and second memories as identification data for discriminating said composite object image included in a target object image which is said composite object image or said output image respectively corresponding to arbitrary node or root, for generating a third identification data group to output and store in said first and second memories as identification data for discriminating said elemental object image included in said target object image, for generating fourth identification data to output and store in said second memory as identification data for discriminating said target object image, and for generating decision data for deciding as to whether said target object image corresponds to said node or said root in said tree structure so as to output said decision data to an object image transmitter;

a scene data transformer for transforming composite scene data and scene data into a transform scene data group as a relative value to output it to an object composer, in which said composite scene data are that of said composite object image included in said target object image and are outputted from said second memory based on said third identification data, said scene data are that of the elemental object image included in the target object image and are outputted from said second memory based on said 10o third identification data group, and said transform scene data group corresponds to said composite scene data of said target object image outputted from said second memory based on said fourth identification data;

said object composer for generating composite image data including a composite image of said target object image to output it to said object image transmitter, based on said composite object image data, said elemental object image data and said transformation scene data group, in which said composite object image data include said composite object image included in the target object image and are outputted from said first memory based on said third identification data, in which said elemental object image data include said elemental object image included in said target object image and are outputted from said first memory based on said third identification data, and in which said transformation scene data group is outputted from said scene data transformer; and said object image transmitter for outputting said composite image data to an image display unit in a first case where said decision data determine said target object image to be said output image corresponding to said root, and for outputting said composite image data as a new object image to said first memory to be stored together with said identification data of said target object image in a second case where the identification data determine said target object image corresponding to said node: and said picture image composition system, wherein said first and second memories and said identification data extractor respectively input as target object identification data the identification data which are to identify as the target said elemental or composite object image which is selected by a user from the elemental or composite image constituting the output image;

wherein, when the second memory receives required scene data which are required by the user to said target object image, the second memory rewrites the scene information of said target object image to said required scene data;

wherein said identification data extractor generates fifth and sixth identification data, a fifth identification data group to input in the first and second memories and decision data to input the object image transmitter, in which said fifth identification data are to identify the composite object image included in the composite object image comprising of the target object image, said sixth identification data are to identify said composite object image consisting of said target object image, said fifth identification data group is to identify said elemental object image included in said composite object image comprising said target object image, and said decision data are to decide as to whether said composite object image comprising said target object image corresponds to said node or said root;

wherein said scene data transformer transforms first and second required scene data into a transformation scene data group to output to said object composer, in which said first required scene data are said required scene data of said target object image or said scene data of said composite object image outputted from said second memory based on said fifth identification data, said second required scene data are said required scene data of said target object image or said scene data of said elemental object image outputted from said second memory based on said fifth identification data group, and said transformation scene data group has a relative value corresponding to composite scene data outputted from said second memory based on said sixth identification data for discriminating said composite object image comprising said target object image;

wherein said object composer for generating object image of said composite object image to output it as composite image data to said object image transmitter based on first and second image data of said composite object or said target object and said transformation scene data group, in which said composite image includes said composite object image comprising said target object image, said first image data are output ted from said first memory based on said fifth identification data, said second image data are outputted from said first memory based on said fifth identification data group, and said transformation scene group is outputted from said scene data transformer; and wherein said object image transmitter, based on said decision data, outputs said composite image data to said image display unit when said composite object image comprising said target object image corresponds to the root, and outputs composite image data as a new object image to said first memory to store them together with identification data of said composite object image of an upper rank when the composite object image comprising the target object image corresponds to said node: and said picture image composition system, further comprising:

a partial tree generator to which said object structure data are inputted:

wherein said first and second memories and said partial tree generator respectively input as target object identification data said identification data which are to identify as said target object image said elemental or composite object image which is selected by a user from said elemental or composite image constituting the output image;

wherein, when the second memory receives required scene data which are required by the user to said target object image, said second memory rewrites said scene information of said target object image to said required scene data;

wherein said partial tree generator generates partial object structure data representing a partial tree structure to store them in said third memory, in which the partial tree structure has a constitution in which a first tree structure consisting of the elemental object image of one rank under said output image has no change, a second tree structure of said composite object image of one rank under said output image and not constituting of said target object image changes to a first single composite object image having said composite object image and said composite scene data, and a third structure of said composite object image included in said composite object image comprising said target object image changes to a second single composite object image having said composite object image data and said composite scene data or required scene data;

wherein said third memory rewrites the stored object structure data to said partial object structure data;

wherein said identification data extractor generates eighth identification data of said composite object image comprising said target object image based on said partial object structure data so as to output said eighth identification data to said first and second memories, generates seventh identification data for discriminating the composite object image included in said composite object image comprising said target object image so as to output said seventh identification data to said first and second memories, generates a seventh identification data group as identification data for discriminating said composite object image comprising said target object image so as to output said seventh identification data group to said first and second memories, and generates decision data for deciding as to whether said composite object image comprising said target object image corresponds to said node or root in said object structure data so as to output said decision data to said object image transmitter;

wherein said scene data transformer transforms said first and second required scene data into a transformation scene data group to output to said object composer, in which said first required scene data are said required scene data of said target object image or said scene data of said composite object image outputted from said second memory based on said seventh identification data, said second required scene data are the required scene data of said target object image or said scene data of said elemental object image outputted from said second memory based on said seventh identification data group, and said transformation scene data group has a relative value corresponding to composite scene data outputted from said second memory based on said eighth identification data for discriminating said composite object image comprising said target object image;

wherein said object composer generates a composite image of said composite object image to output it as composite image data to said object image transmitter based on first and second image data of said composite object or said target object and said transformation scene data group, in which said composite image includes said composite object image comprising said target object image, said first image data are outputted from said first memory based on said seventh identification data, said second image data are outputted from said first memory based on said seventh identification data group, and said transformation scene group is outputted from said scene data transformer; and wherein said object image transmitter, based on said decision data, outputs said composite image data to said image display unit when said composite object image comprising said target object image corresponds to said root, and outputs composite image data as a new object image to said first memory to store them together with identification data of said composite object image of an upper rank when said composite object image comprising said target object image corresponds to said node.

9. The picture image composition system according to claim 8, wherein said scene data composer comprises:

a fourth memory for storing said object structure data;

a tree retriever for outputting said identification data of said elemental and composite object images included in said composite object image corresponding to an arbitrary node in said tree structure representing said object structure data, based on said object structure data, to said second memory, and for outputting said identification data as second identification data of said composite object image corresponding to said arbitrary node, to said second memory; and a scene data generator for calculating as composite scene data said scene data of said composite object image corresponding to said arbitrary node based on said scene data of said elemental and composite object images included in said composite object image corresponding to said arbitrary node which are outputted from said second memory.

10. The picture image composition system according to claim 9, wherein:

operation for calculating as said composite scene data said scene data of said composite object image corresponding to said arbitrary node, is a calculation of, as said composite scene data, a mean value of said scene data of said elemental and composite object images included in said composite object image corresponding to said arbitrary node, or is a calculation of, as said composite scene data, one of said elemental and composite object images included in said composite object image corresponding to said arbitrary node.

11. The picture image composition system according to a claim 10, wherein said scene data include position data, and transformation data including geometrical transformation data, light source data and color transformation data.

12. The picture image composition system according to claim 8, wherein said object composer comprises:

a scene data separator for outputting transformation data and position data which are generated from separating said scene data;

an image processing unit for outputting a processed image generated from said object image data outputted from said first memory after image processing based on said transformation data; and a frame memory for storing processed image based on said position data.

* * * * *